US008225285B2

(12) United States Patent
Godwin et al.

(10) Patent No.: US 8,225,285 B2
(45) Date of Patent: Jul. 17, 2012

(54) GENERATING A TEST SUITE TO TEST SUPPORT FOR ROUTINES

(75) Inventors: David Richard Godwin, Whitby (CA); Ciby Mathew, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1589 days.

(21) Appl. No.: 11/397,135

(22) Filed: Apr. 3, 2006

(65) Prior Publication Data

US 2007/0234314 A1 Oct. 4, 2007

(51) Int. Cl.
*G06F 9/44* (2006.01)
(52) U.S. Cl. .................. 717/124; 717/125; 717/136
(58) Field of Classification Search .................. None
See application file for complete search history.

(56) References Cited

U.S. PATENT DOCUMENTS

| | | | | |
|---|---|---|---|---|
| 6,353,897 | B1 * | 3/2002 | Nock et al. ............... | 714/38 |
| 6,581,052 | B1 * | 6/2003 | Slutz ........................ | 1/1 |
| 6,883,164 | B2 * | 4/2005 | Zhang et al. ............. | 717/136 |
| 6,944,848 | B2 * | 9/2005 | Hartman et al. ......... | 717/124 |
| 7,257,804 | B2 * | 8/2007 | Baecker et al. .......... | 717/124 |
| 7,278,135 | B2 * | 10/2007 | Czerwonka ............... | 717/124 |
| 7,363,616 | B2 * | 4/2008 | Kalyanaraman .......... | 717/124 |
| 7,581,212 | B2 * | 8/2009 | West et al. ............... | 717/124 |
| 7,950,004 | B2 * | 5/2011 | Vieira et al. ............. | 717/125 |

OTHER PUBLICATIONS

Chan et al, Fault-Based Testing of Database Application Programs with Conceptual Data Model, Proceeding of the 5th International Conference on quality Software (QSIC 2005), pp. 187-196, Retrieved on [Mar. 24, 2010] Retrieved from the Internet:URL<http://ieeexplore.ieee.org/stamp/stamp.jsp?arnumber=01579135.*

Deng et al, Testing Database Transactions with Agenda, Proceedings of the 27th international conference on software engineering, 2005, pp. 78-87, Retrieved on [Mar. 2, 2012], Retrieved from the Internet: URL<http://dl.acm.org/citation.cfm?id=1062486&bnc=1>.*

Chan et al, Testing Database Applications with SQL Semantics, Proceedings of 2nd International Symposium on Cooperative Database Systems for Advanced Applications, Mar. 1999, pp. 363-374, Retrieved on [Mar. 2, 2012] Retrieved from the Internet: URL<http://home.cse.ust.hk/faculty/scc/publ/CODAS99.pdf>.*

* cited by examiner

*Primary Examiner* — Thuy Dao
*Assistant Examiner* — Cheneca Smith
(74) *Attorney, Agent, or Firm* — Janaki K. Davda; Konrad Raynes & Victor LLP (57) ABSTRACT

Provided are techniques for generating a test suite. A statement grouping is generated based on operating parameters in a first operating parameters package. A data model is generated from the statement grouping based on operating parameters in a second operating parameters package. Then, one or more routine definitions are generated from the data model based on operating parameters in a third operating parameters package.

18 Claims, 9 Drawing Sheets

GENERATING A TEST SUITE TO TEST SUPPORT FOR ROUTINES

BACKGROUND

1. Field

Embodiments of the invention relate to generating a test suite to test support for routines.

2. Description of the Related Art

Relational DataBase Management System (RDBMS) software may use a Structured Query Language (SQL) interface. The SQL interface has evolved into a standard language for RDBMS software and has been adopted as such by both the American National Standards Institute (ANSI) and the International Standards Organization (ISO).

A routine (e.g., a stored procedure, a user-defined scalar function or a table function) can embed one or more SQL statements to access a database, manipulate parameter values, invoke other routines, and/or return scalar or tabular results. In addition, a vendor of a product may support a variety of languages that interface an application to a database engine (such as an RDBMS) and also tolerate routine invocation across languages.

A test suite may be described as a collection of tests or as a collective term for subtests that differ in focus. A test suite may be used to validate a computer program by exercising the functionality of the computer program through an interface and under conditions that may simulate the use of that computer program in production. Validating may include evaluating one or more aspects of the computer program or checking a condition, such as the functioning, accuracy or correctness of the computer program. In the case of a test suite that tests routines, the test coverage may include variation in the content and structure of the routines and in combinations of routines, including combinations that are ordered hierarchically. This results in a large collection of test cases that are expensive to create and maintain manually. That is, the quantitative and qualitative demands on a test suite generator make it difficult to use a manual solution, especially given the short duration between adding a feature to a database product and the start of the test cycle for that feature.

Thus, there is a need in the art for generating a test suite to test support for routines.

SUMMARY OF EMBODIMENTS OF THE INVENTION

Provided are a method, computer program product, and system for generating a test suite. A statement grouping is generated based on operating parameters in a first operating parameters package. A data model is generated from the statement grouping based on operating parameters in a second operating parameters package. Then, one or more routine definitions are generated from the data model based on operating parameters in a third operating parameters package.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments present a test suite generator that can build granularity and purpose into a test suite. The test suite generator provided by embodiments can generate a complex test suite quickly.

Figure 1:
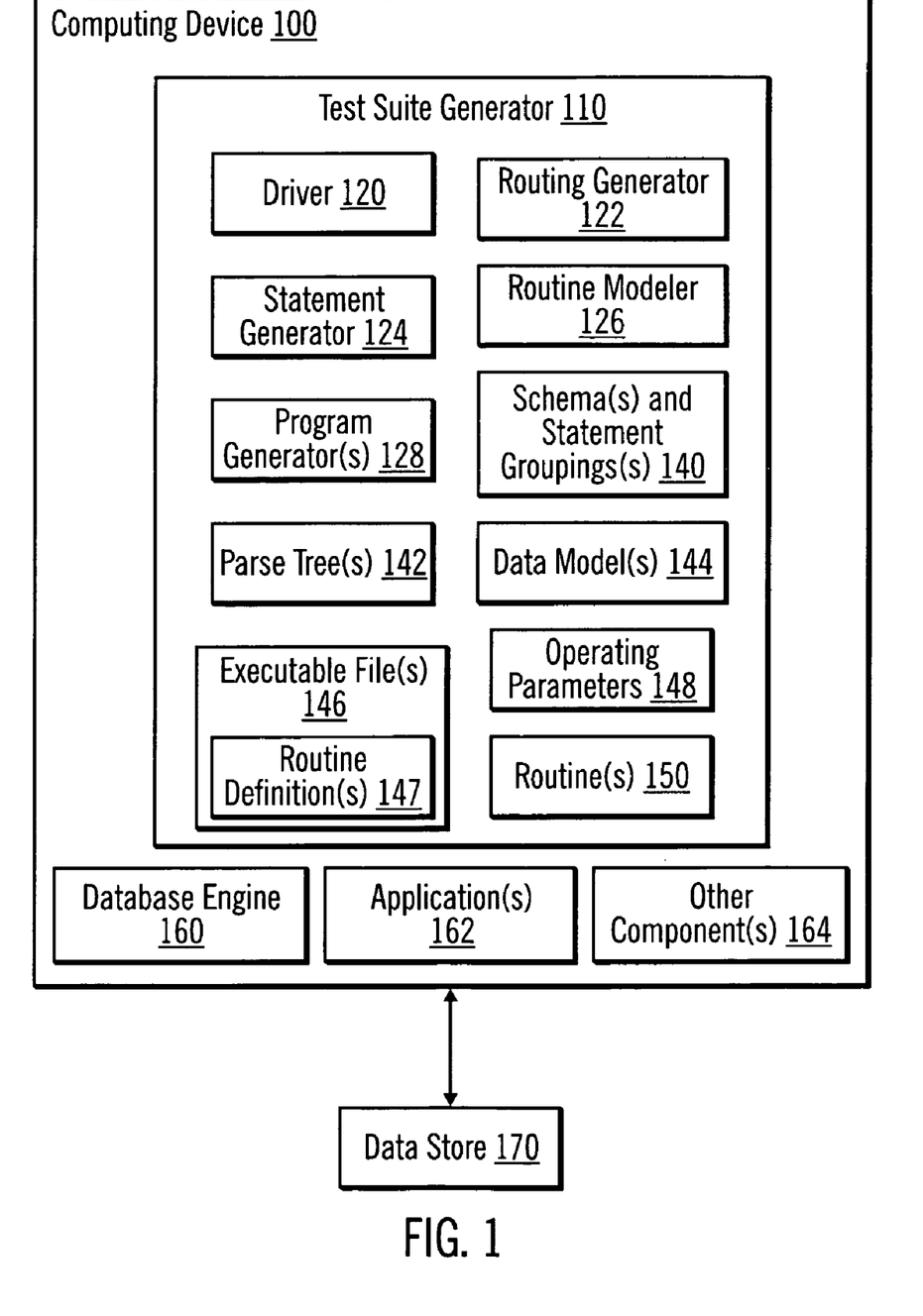
FIG. 1 illustrates details of a computing device in accordance with certain embodiments.

Although examples herein may refer to SQL or to a database engine, embodiments are applicable to procedural languages other than SQL and to various data store engines that control storage of and access to data in data stores. FIG. 1 illustrates details of a computing device 100 in accordance with certain embodiments. The computing device 100 includes a test suite generator 110 and may include a database engine 160, such as a RDBMS, one or more applications 162, and one or more other components 164. The computing device 100 is coupled to a data store 170. In certain embodiments, the data store 170 is a database. The test suite generator 110 includes a driver 120 that stores operating parameters 148 (e.g., in non-volatile storage) that are then passed to a routine generator 122. The routine generator 122 generates operating parameters packages from the operating parameters 148. The test suite generator 110 also includes a statement generator 124 that generates one or more schemas and statement groupings 140. A statement grouping may be described as a group of statements. The statement grouping may include various statements, such as SQL Select, Insert, and Update statements. Additionally, the statement grouping for one routine may include a statement that is used to invoke another routine (e.g., CALL <routine identifier><zero or more arguments>, such as an SQL CALL statement, such as "CALL wildcat.sp8112java (?, ?, ?, ?, ?, ?, ?)", which is used to invoke the wildcat.sp8112java routine ), and this enables nesting of routines. Moreover, the statement grouping includes content for a routine (i.e., information later used by the program generator 128 to generate a routine definition (e.g., an SQL Create Procedure or Create Function statement)). The routine definition may be said to be source code. The statement generator 124 generates one or more parse trees 142 that describes the statement grouping. A parse tree 142 may be described as providing meta information. The test suite generator 110 also includes a routine modeler 126 that builds an annotated data model of a routine. The routine modeler 126 uses the one or more parse trees and generates one or more data models 144 from the one or more parse trees. The test suite generator 110 further includes one or more program generators 128 that map the one or more data models 144 to one or more routine definitions (e.g., an SQL Create Procedure or Create Function statement). The routine definitions may be stored in one or more executable files 146. When the routine definitions are submitted to a database engine 160, the result is that one or more routines 150 forming a test suite are created in the data store 170. Then, these routines 150 may be executed to test one or more features of the data store 170.

In certain embodiments, a generated routine is also translated into an invocable form that is mixed into the content of another routine to create an invocation. This process may be repeated to create a hierarchy of routines that nest to an arbitrary depth. For example, a first routine may invoke a second routine, and the second routine may, in turn, invoke a third routine. In certain embodiments, the generation of the test suite may be subject to constraints reflected in operating parameters (e.g., imposed by a vendor) that influence the definition of routines. In certain embodiments, these constraints that are reflected in the operating parameters are enforced by interfaces to test suite generator 110 components (e.g., 122, 124, 126, 128). Thus, embodiments allow for a variety of routines to be created within a test suite by varying the operating parameters to the components 122, 124, 126, 128. The number of possible test suites is then a function of operating parameter combinations, which enables distinct test suites to be built to enhance test coverage. In this manner, embodiments provide a solution that allows for a succinct description that may translate into a test suite that is capable of being used to stress-test support for routines in a database engine.

In alternative embodiments, the components 120, 122, 124, 126, 128 of the test suite generator 110 may be implemented as hardware, software, firmware or a combination of these.

The computing device 100 may comprise any computing device known in the art, such as a server, mainframe, workstation, personal computer, hand held computer, laptop telephony device, network appliance, etc.

The data store 170 may comprise an array of storage devices, such as Direct Access Storage Devices (DASDs), Just a Bunch of Disks (JBOD), Redundant Array of Independent Disks (RAID), virtualization device, etc.

Figure 2:
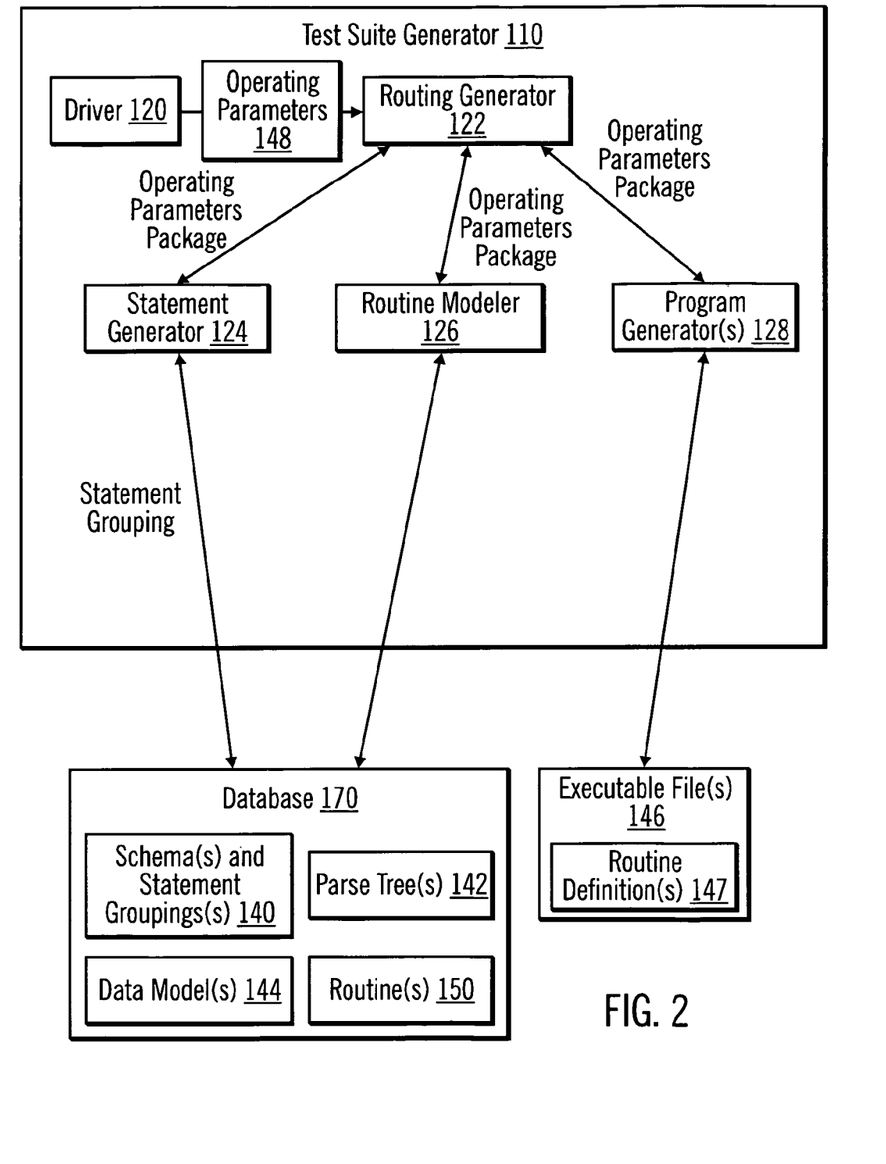
FIG. 2 illustrates process and data flow when generating a routine in accordance with certain embodiments.

FIG. 2 illustrates process and data flow when generating a routine in accordance with certain embodiments. A driver 120 persists (e.g., stores in non-volatile storage) operating parameters 148 (also referred to as "options") passed to the routine generator 122, which in turn separates the operating parameters 148 into operating parameters packages so that each operating parameters package includes operating parameters 148 appropriate to the statement generator 124, the routine modeler 126, and the program generator 128, respectively. In certain embodiments, some operating parameters 148 may be included in more than one operating parameters package for more than one component 124, 126, 128. In certain embodiments, the routine generator 122 invokes the statement generator 124, the routine modeler 126, and the program generator 128 serially. During processing, a data store 170 saves the statement grouping 140 (e.g., a group of SQL statements) and parse tree 142 produced by the statement generator 124 and the data model 144 produced by the routine modeler 126. Also, the program generator 128 produces an executable file 146 that includes at least one routine definition 147. Although saving the operating parameters 148 and statement grouping 140 is optional, saving this information may help later on in debugging or generating statistics.

Figure 3A:
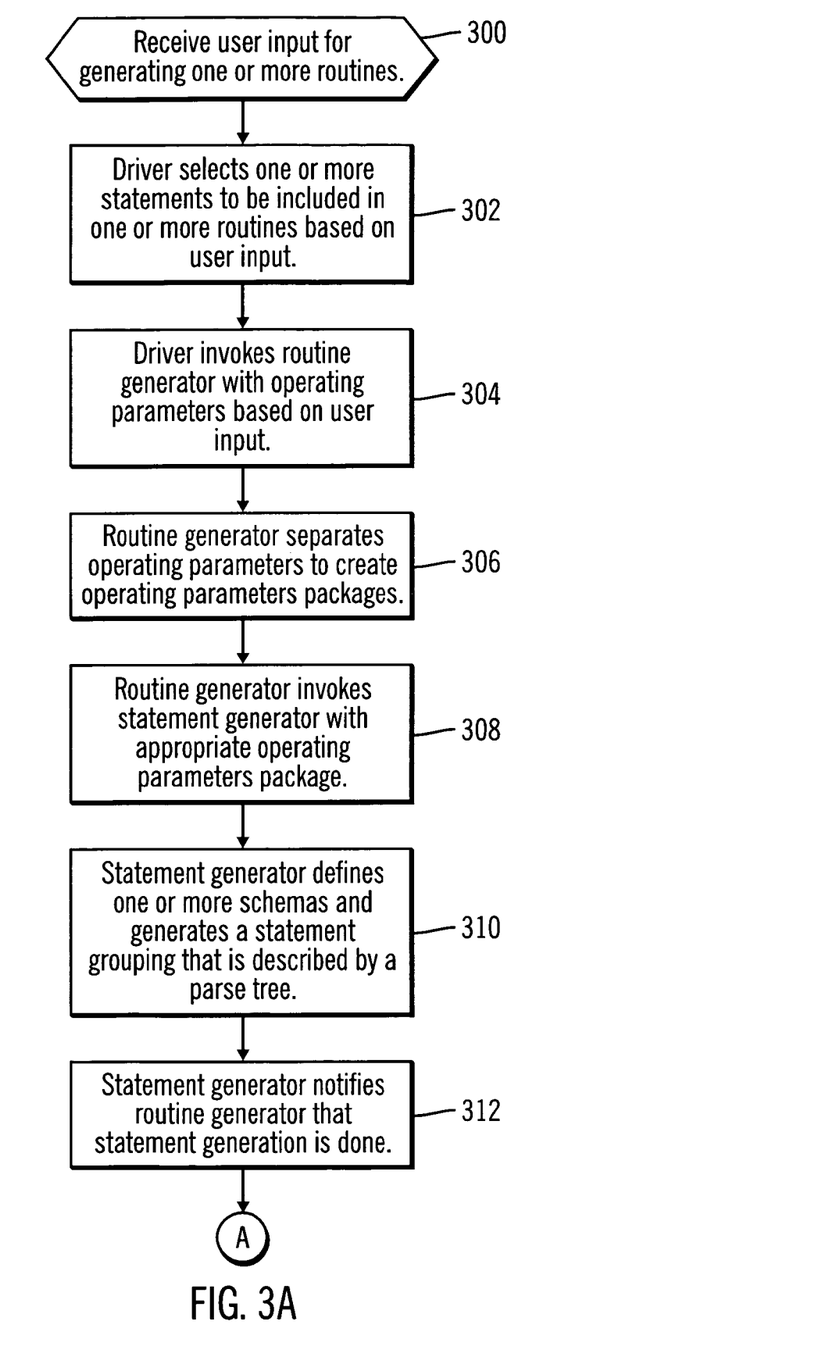
FIGS. 3A and 3B illustrate logic for generating a test suite in accordance with certain embodiments.
Figure 3B:
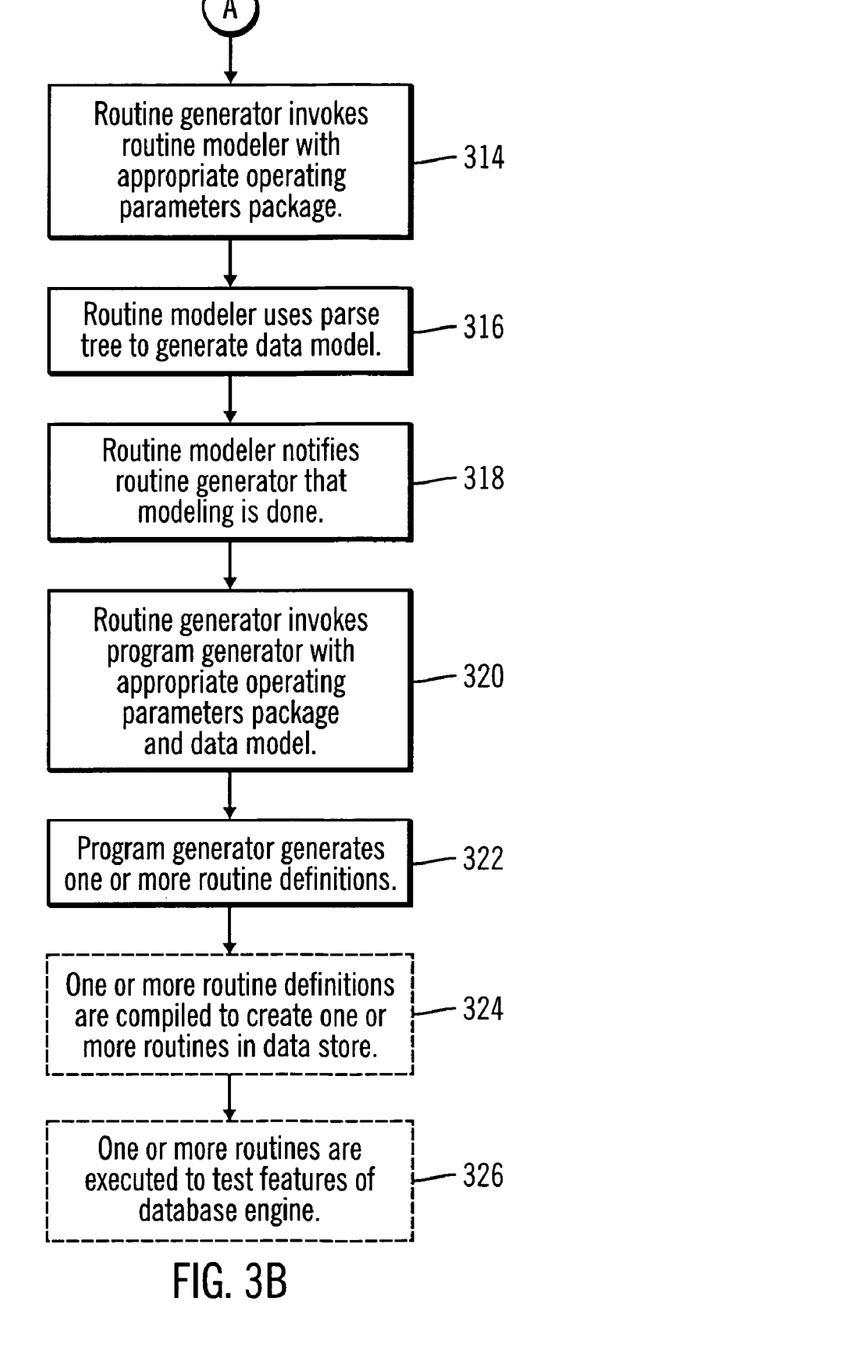

FIGS. 3A and 3B illustrate logic for generating a test suite in accordance with certain embodiments. Control begins at block 300 with the test suite generator 110 receiving user input for generating one or more routines. The user input may be in the form of operating parameters.

The following is a sample command-line representing user input:
<program> <routine type> <language> <language constraints> <number of input parameters> <number of output parameters> <number of result sets> <number of columns in resulting table> <shuffle or not> <number of statements to group> <seed>

The following are sample operating parameters input by a user for generating first-level routines (i.e., routines that do not invoke other routines):
create test tables
generate a set of SQL updates and queries against test tables and store along with SQL description, including statement type, parameter markers and types, description of result set if query, etc.
generate description of routine that embeds set of SQL statements, including type of routine (stored procedure or scalar or table user-defined function), language to generate definition in, limit on number of input and output parameters, limit on number of result sets if stored procedure, limit on number of columns in resulting table if table function, whether statements are to be shuffled before embedding, number of statements to group in a routine, initial seed for random number generator (used when making choices)
generate SQL to invoke routine and store
use program generator 128 to generate routine definitions from descriptions
compile routine definitions and store result in a directory
record test tables, then drop test tables The following are sample operating parameters input by a user for generating second-level routines that invoke first-level routines:
create test tables
generate a set of SQL updates and queries against test tables, include SQL to invoke routines from first level, and store set along with SQL description, including statement type, parameter markers and types, description of result set if query, etc. Here stored procedures from first level appear as SQL CALL statements, and user-defined functions are invoked from SQL queries.

The process for creating second-level routines may be repeated an arbitrary number of times, each time producing statements (e.g., in SQL) to invoke the routines generated just prior to the current iteration.

In block 302, the driver 120 selects one or more statements to be included in one or more routines based on the user input. In block 304, the driver 120 invokes the routine generator 122 with operating parameters based on user input.

In block 306, the routine generator 122 separates the operating parameters to create operating parameters packages (i.e., for the statement generator 124, the routine modeler 126, and the program generator 128, respectively). In block 308, the routine generator 122 invokes the statement generator 124 with the appropriate operating parameters package.

In block 310, the statement generator 124 defines one or more schemas and a statement grouping that is described by a parse tree. The statement grouping may include various statements, such as SQL Select, Insert, and Update statements. Additionally, the statement grouping for one routine may include a statement that is used to invoke another routine (e.g., CALL <routine identifier><zero or more arguments>, such as an SQL CALL statement, such as "CALL wildcat.sp8112java (?, ?, ?, ?, ?, ?, ?)", which is used to invoke the wildcat.sp8112java routine). In certain embodiments, the statement that is used to invoke another routine is created based on a routine definition that was previously created for that other routine (e.g., the routine to be invoked is defined before the SQL CALL statement is generated). Moreover, the statement grouping includes content for a routine (i.e., information later used by the program generator 128 to generate a routine definition). In particular, the statement generator 124 has a set of valid tokens (e.g., words) that may be included in a statement (e.g., an SQL statement). The statement generator 124 concatenates tokens into a sentence (e.g., an SQL statement). In certain embodiments, the statement generator 124 uses randomness to choose between alternative tokens and uses heuristics that respect language constraints (i.e., the heuristics indicate which tokens do and do not form valid statements (e.g., SQL statements) when concatenated). The statement generator 124 defines one or more schemas. A schema consists of tables and dependencies, such as views, indexes, etc. The definitions of the one or more schemas are persisted to be ultimately packaged as a workload. A workload may be described as textual content that is submitted for processing to a complier (e.g., an SQL compiler). When defining content for a routine, the statement generator 124 recalls the definitions of the one or more schemas in order to build statements that query and update (i.e., forms of accessing) the schema. The statements generated are marked up to describe the kind of statement and associated metadata.

The statement generator 124 (e.g., via an interface) offers options to control the characteristics of its output, including accepting hints that are vendor-specific (e.g., statement length) and those that are not vendor-specific (e.g., a hard limit on a number of scalar functions to invoke from a query).

The statement generator 124 may store schemas and statement groupings 140 in the data store 170. In block 312, the statement generator 124 notifies the routine generator 122 that statement generation is done. From block 312 (FIG. 3A), processing continues to block 314 (FIG. 3B).

In block 314, the routine generator 122 invokes the routine modeler 126 with an appropriate operating parameters package. In block 316, the routine modeler 126 uses the parse tree 142 to generate a data model 144. The following is a sample parse tree assuming a certain routine definition contained an SQL insert statement and an SQL CALL statement:
statement="INSERT INTO mytable VALUES (?, ?)"
pmarker1.type="CHAR"
pmarker1.length="30"
pmarker2.type="INTEGER"
pmarker2.length="8"
statement="CALL mysp (?)"
pmarker1.type="DECIMAL"
pmarker1.length="4"
pmarker1.scale="2"
etc.

Figure 4:
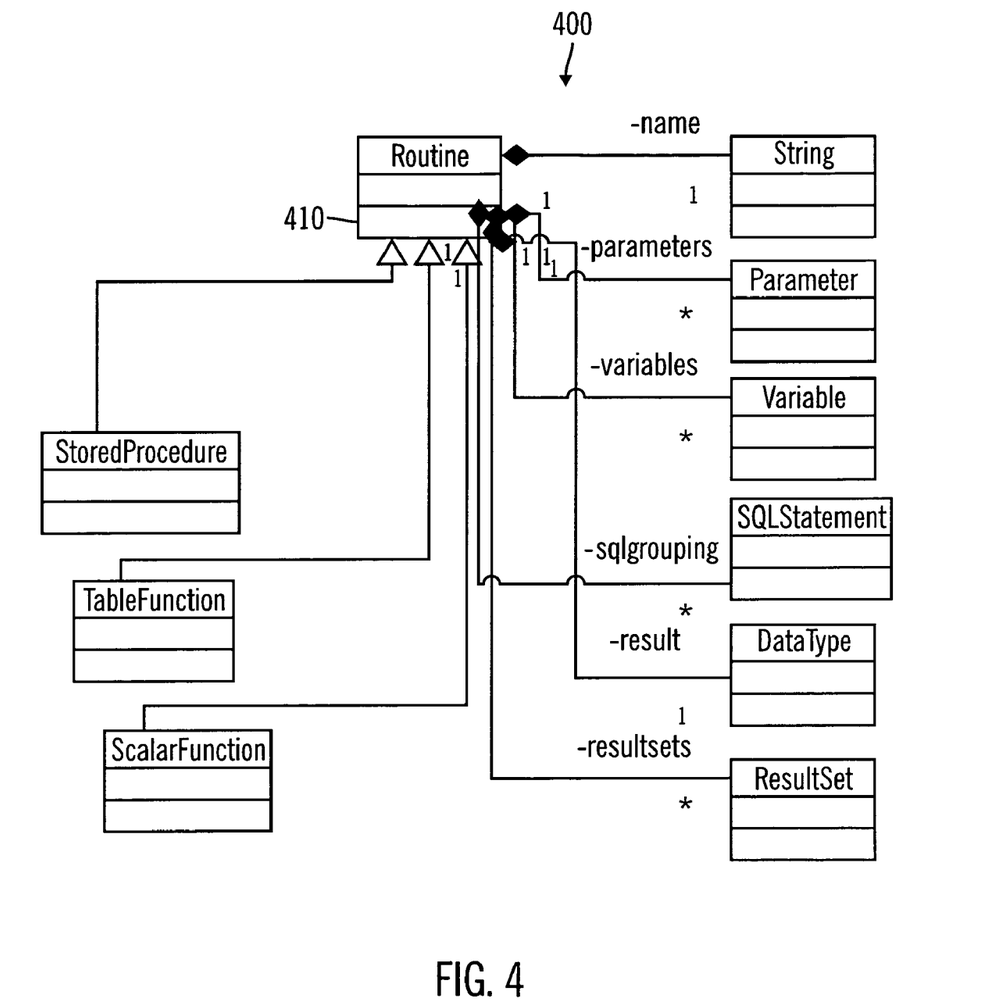
FIG. 4 illustrates a sample annotated data model in accordance with certain embodiments.

The routine modeler 126 uses the parse tree 142 to generate a data model 144. FIG. 4 illustrates a sample annotated data model 400 in accordance with certain embodiments. The annotated data model 400 is illustrated as a static class diagram that uses Unified Modeling Language (UML) notation to show metadata that describes a routine. With UML notation, a black diamond indicates a "contain" relationship. The metadata includes information about host variable declarations that are used by a program generator 128 to generate one or more routine definitions that are stored in executable files 146. For example, in FIG. 4, the annotated data model 400 provides metadata for a name, parameters, variables, an sql-grouping, a result, and resultsets for a routine 410 that may be a stored procedure, a table function or a scalar function.

Thus, the routine modeler 126 focuses on generating a data model for a routine from operating parameters in the operating parameters package that name the routine, attach modifiers that affect runtime behavior, and layout the content in a language independent manner (i.e., as a data model 144 in a computer program). The routine modeler 126 materializes a statement grouping 140 described by a parse tree 142 as a data model 144 that is influenced by both content and operating parameters. For instance, a parameter list of a minimum length may be constructed or may be buffered to ensure a minimum size, or may be used to supply values from an invoking routine. In certain embodiments, to improve usability, operating parameters input to the routine modeler 126 (e.g., via an interface) are kept to a minimum, and lesser details (e.g., visibility of a variable across program blocks) is influenced by a random decision by the routine modeler 126. Additional operating parameters to the routine modeler 126 impart a suggested flavor to possibilities for processing SQL within a routine (e.g., a limit on the number of queries returned as result sets from a routine, a terminating condition for a looping insert, etc.). A language operating parameter to the routine modeler 126 selects from a choice of program generators 128 that produce routine definitions containing SQL statements that are embedded into an external programming language (e.g., the JAVA® programming language).

In block 318, the routine modeler 126 notifies the routine generator 122 that modeling is done. In block 320, the routine generator invokes a program generator 128 with an appropriate operating parameters package and with the data model 144. In block 322, the program generator 128 generates one or more routine definitions 147 (e.g., one or more SQL Create Procedure or Create Function statements). In certain embodiments, the program generator 128 embeds one or more routine definitions in an external programming language. Also, the program generator 128 stores the routine definitions 147 in one or more executable files 146. A routine definition is accompanied by, for example, build scripts to compile the routine definition into an executable library and install scripts that shield a tester from environmental concerns that do not add to the value of a test.

In block 324, the one or more routine definitions 147 are compiled to create one or more routines 324 in the data store 170. In block 326, the one or more routines 150 are executed to test features of the database engine 160.

Thus, embodiments enable automatic generation of a test suite of routines to stress-test a database engine 160 by executing the routines 150 (e.g., from a concurrency driver (not shown) that triggers a cascading of invocations between routine types). In this manner, embodiments are able to simulate a production environment.

Figure 5:
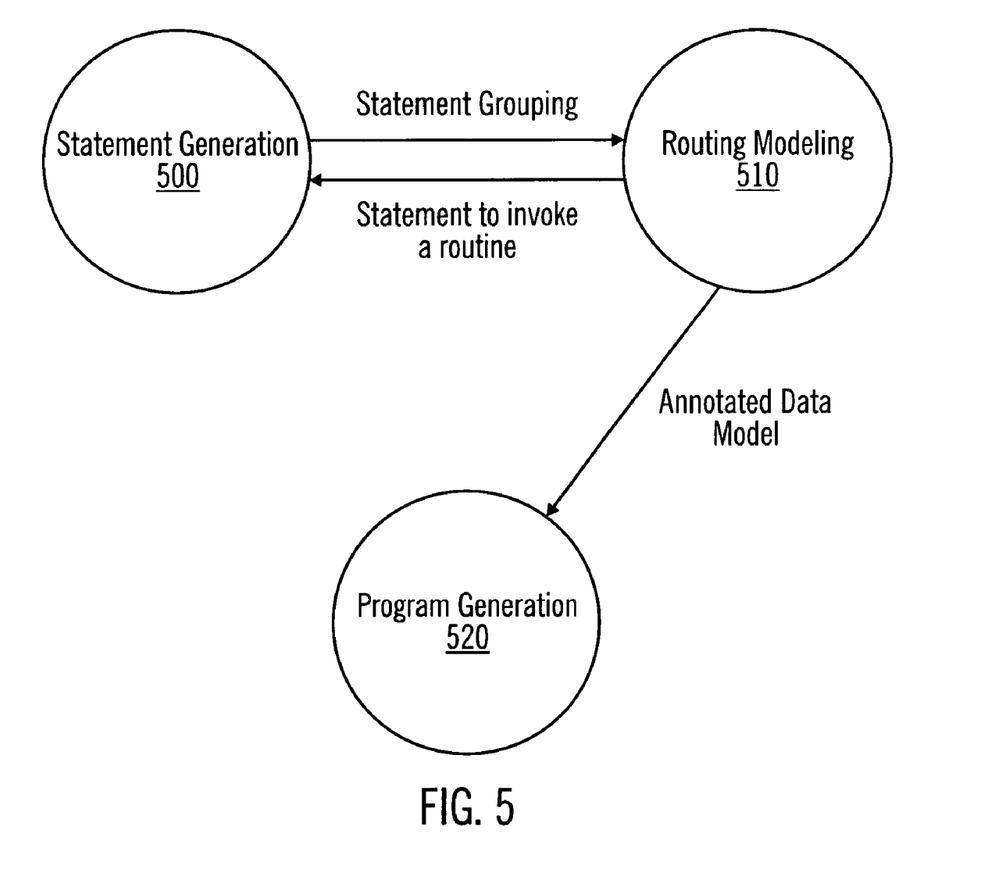
FIG. 5 illustrates an iterative data flow in accordance with certain embodiments.

FIG. 5 illustrates an iterative data flow in accordance with certain embodiments. FIG. 5 illustrates functional aspects of the invention rather than the logical flow of FIGS. 3A and 3B. In FIG. 5, statement generation 500 outputs a first statement grouping that does not include a statement to invoke a routine (e.g., an SQL CALL statement), but that does include content for a first routine, to routine modeling 510. Routine modeling 510 embeds the content into an annotated data model, which is then output to program generation 520. The program generation 520 converts the annotated data model to a routine definition. Additionally, routine modeling 510 returns a statement to invoke the first routine to the statement generation 500 so that the statement generation 500 may include the statement to invoke the first routine when generating a second statement grouping for a second routine. The flow of processing between routine modeling 510 and statement generation 500 may occur zero or more times. The flow of processing may be repeated to include multiple routine invocation statements in a single routine definition. That is, such processing may be iterative so that a routine may invoke a routine that, in turn, invokes another routine. In this manner, embodiments enable nested routine invocations.

Figure 6:
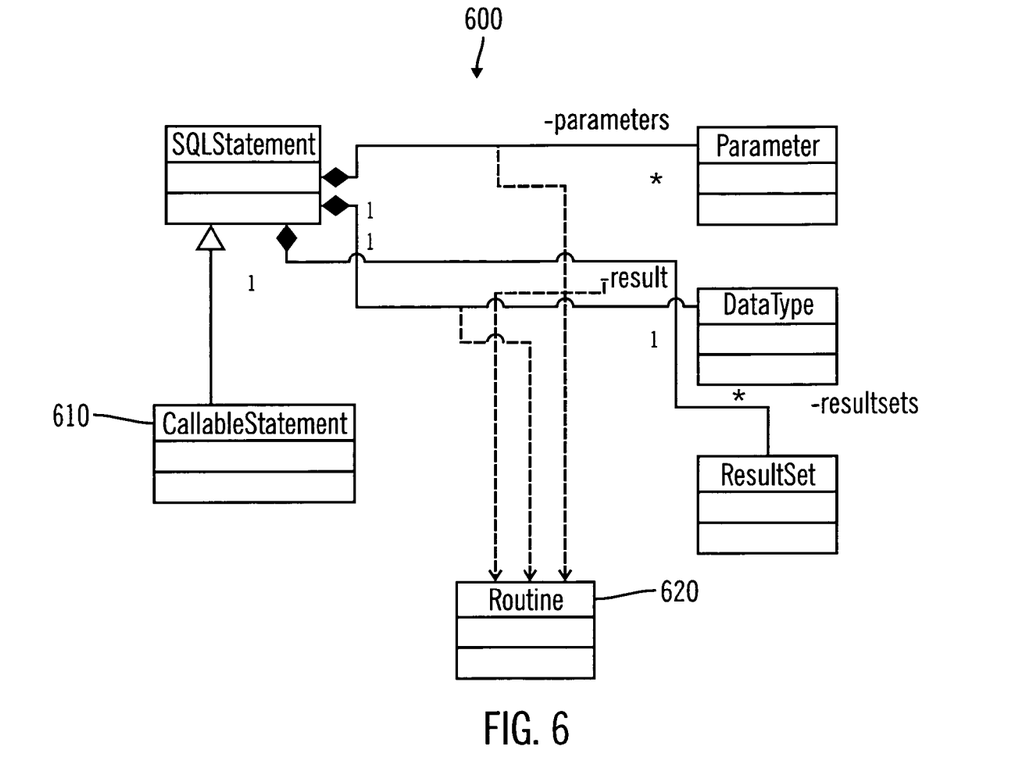
FIG. 6 illustrates a nested routine invocation in accordance with certain embodiments.

FIG. 6 illustrates a nested routine invocation in accordance with certain embodiments. In FIG. 6, a static class diagram 600 uses UML notation to demonstrate that a routine definition may be deduced from the definition of a routine (i.e., from parameters, a return value, and result sets) in the diagram 600. Such information is also used to construct the execution logic to handle an invocation of that routine. The execution logic may be described as the set of supporting programming instructions that prepare for, execute, and handle return values of the routine. The routine definition 620 influences the use of parameters and the generation of a result and resultsets. For instance, an insert statement may embed a scalar function or a call may be followed by logic to read and close result sets returned from a routine. The invocable form of a routine may be mixed, along with marked-up content, into subsequent output from the statement generator 124 in order to construct an invocation.

Figure 7:
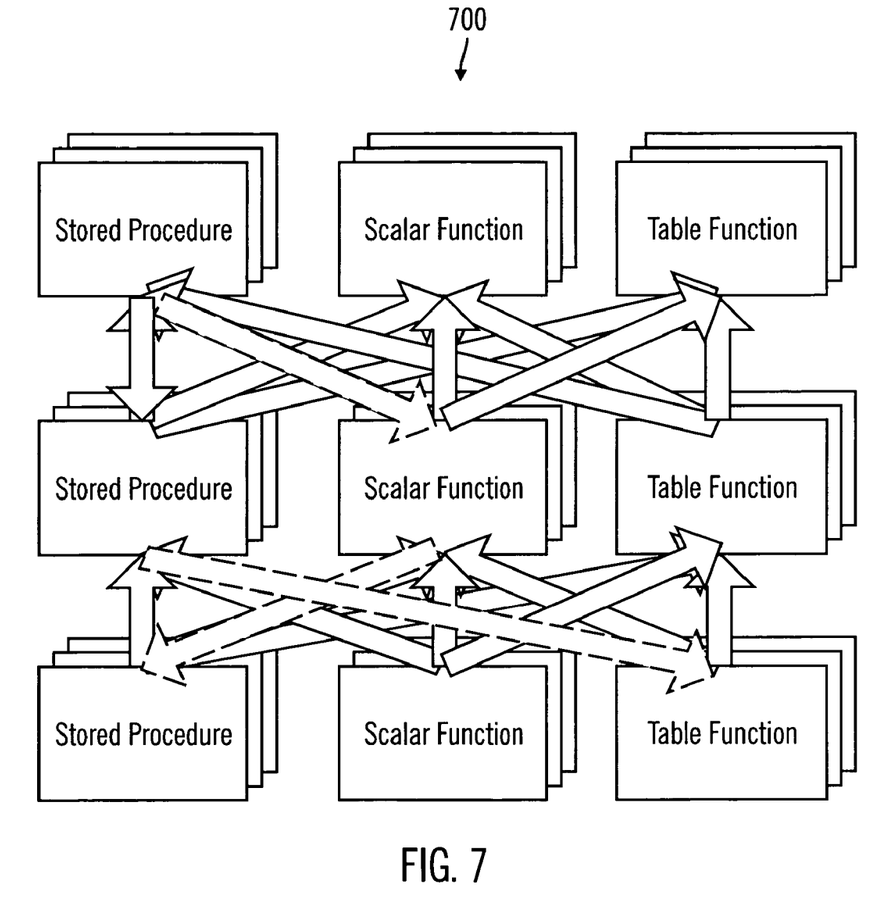
FIG. 7 illustrates inter-routine invocation (solid lines) and results (dashed lines) in accordance with certain embodiments.

FIG. 7 illustrates inter-routine invocation (solid lines) and results (dashed lines) in accordance with certain embodiments. FIG. 7 illustrates one of many possible test suites 700. The routine definitions, content, and implementation language may vary, resulting in complexity that is impractical to duplicate manually.

In certain embodiments, a logging mechanism records diagnostics to be analyzed in the event of an unexpected failure, expected errors are prevented from interrupting an execution, and data generated from invoking a routine is logged for analysis.

Thus, embodiments provide a solution that quickly generates a test suite that is effective in flushing out defects of features of the database engine that are being tested.

JAVA is a registered trademark or common law mark of Sun Microsystems in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-RIW) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3A and 3B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3A and 3B may be implemented in software, hardware, programmable and non-programmable gate array logic or in some combination of hardware, software, or gate array logic.

Figure 8:
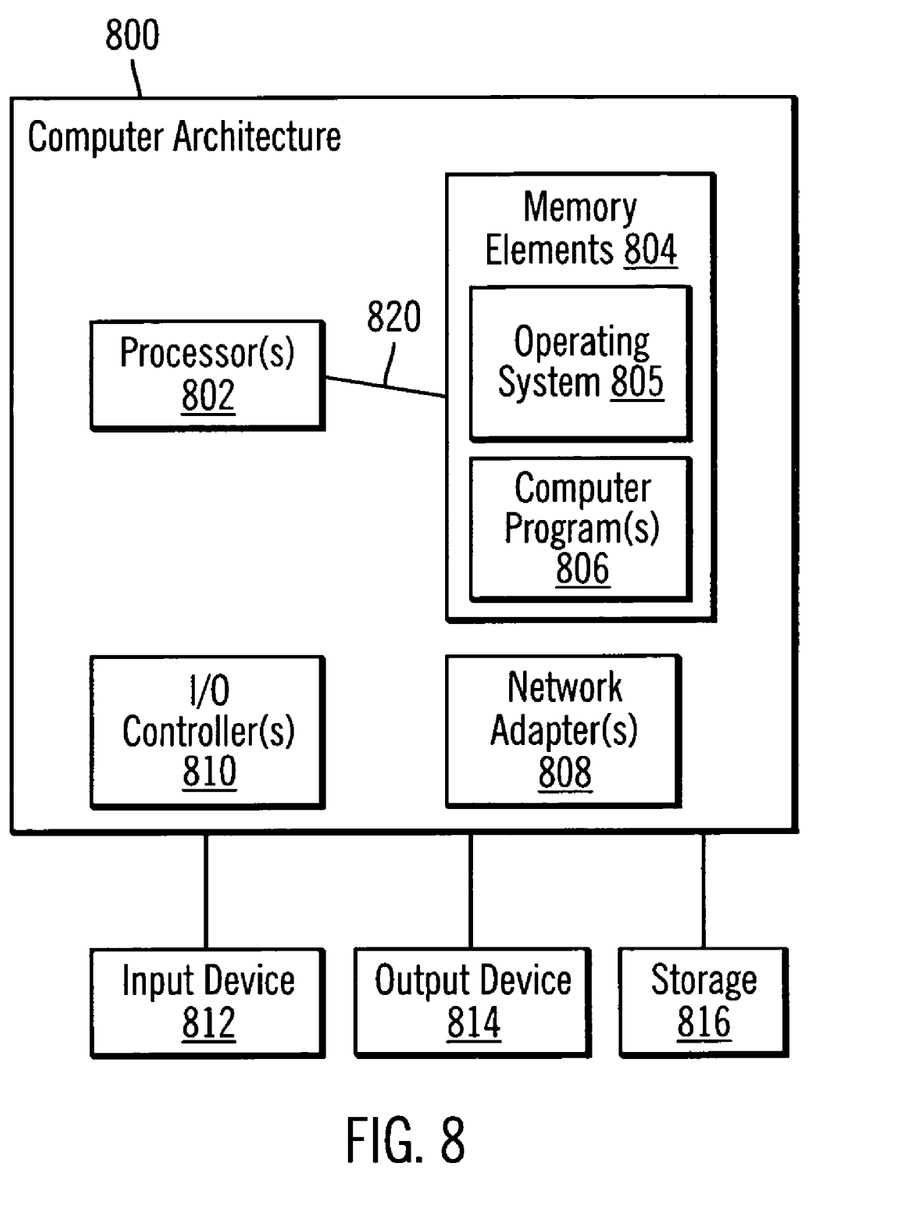
FIG. 8 illustrates a system architecture that may be used in accordance with certain embodiments.

FIG. 8 illustrates a system architecture 800 that may be used in accordance with certain embodiments. Client computer 100 may implement system architecture 800. The system architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The system architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The system architecture 800 may include fewer components than illustrated, additional components not illustrated herein, or some combination of the components illustrated and additional components. The system architecture 800 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The following is a sample of output (i.e., a CALL statement and a portion of an external routine definition in the JAVA® programming language) from the program generator 128:

```
CREATE PROCEDURE wildcat.sp8124java
    (
    IN t3_logpath VARCHAR( 4000 ) ,
    IN t3_ignorelist VARCHAR( 4000 ) ,
    IN t3_echo CHAR( 1 ) ,
    IN t3_maxrows INTEGER ,
    IN t3_pct_null INTEGER ,
    IN t3_nullable CHAR( 1 ) ,
    IN t3_seed INTEGER
    )
RESULT SETS 0
READS SQL DATA
NOT DETERMINISTIC
NULL CALL
LANGUAGE JAVA
EXTERNAL NAME 'wildcatsp8124_jar:wildcatsp8124.wildcatsp8124jdbc'
FENCED
THREADSAFE
PARAMETER STYLE JAVA
@
-------
    public static void wildcatsp8124jdbc
        (
        String t3_logpath,
        String t3_ignorelist,
        String t3_echo,
        int t3_maxrows,
        int t3_pct_null,
        String t3_nullable,
        int t3_seed
        ) throws Exception
        {
//-----------------------------------------------------------
// | (general) local variables.
//-----------------------------------------------------------
        int             t3_sqlrc = 0,
                        t3_updt_count = 0,
...
        T3Aux.t3LogVarchar( t3_logpath, (String)"wildcat.sp8124java--Preparing call . . . ",
"N" );
        try
            {
            t3_call_10901 = t3_conn_normal.prepareCall
                (
                "CALL wildcat.sp8112java ( ?, ?, ?, ?, ?, ?, ? )"
                );
            }
        catch( SQLWarning t3_sqlw)
...
//-----------------------------------------------------------
// | (call) set default parameters.
```

```
//------------------------------------------------------------
        T3Aux.t3LogVarchar( t3__logpath, (String)"wildcat.sp8124java--Setting input
parameter value . . . ", "N" );
        try
        {
            t3__call__10901.setString( 1, t3__logpath );
        }
        catch( SQLWarning t3__sqlw )
...
        T3Aux.t3LogVarchar( t3__logpath, (String)"wildcat.sp8124java--Executing SQL
. . . ", "N" );
        try
        {
            t3__call__10901.execute( );
        }
        catch( SQL Warning t3__sqlw )
        {
...
```

What is claimed is:

1. A computer-implemented method for generating a test suite, comprising:
receiving operating parameters that reflect constraints on the test suite;
selecting one or more statements to be included in one or more routines based on the operating parameters;
separating the operating parameters into a first operating parameters package, a second operating parameters package, and a third operating parameters package;
generating a statement grouping and a parse tree that describes the statement grouping based on the operating parameters in the first operating parameters package;
in response to generating the statement grouping and the parse tree, generating a data model to show metadata that describes the one or more routines from the statement grouping using the parse tree and based on the operating parameters in the second operating parameters package;
in response to generating the data model, generating one or more routine definitions from the data model based on the operating parameters in the third operating parameters package; and
creating the one or more routines from the one or more routine definitions.

2. The method of claim 1, wherein the statement grouping includes content for defining one routine and one or more statements that are used to invoke other routines.

3. The method of claim 2, wherein generating the statement grouping further comprises:
generating one or more schemas, wherein the content for the routine includes one or more statements that access the one or more schemas.

4. The method of claim 1, wherein the one or more routine definitions are compiled to create the one or more routines and wherein the one or more routines are executed to test a data store.

5. The method of claim 4, wherein at least one of the routines invokes one or more other routines.

6. The method of claim 1, wherein the one or more routine definitions are embedded in an external programming language.

7. A computer program product for generating a test suite comprising a computer-readable storage medium storing a computer readable program, wherein the computer readable program when executed on a computer causes the computer to:
receive operating parameters that reflect constraints on the test suite;
select one or more statements to be included in one or more routines based on the operating parameters;
separate the operating parameters into a first operating parameters package, a second operating parameters package, and a third operating parameters package;
generate a statement grouping and a parse tree that describes the statement grouping based on the operating parameters in the first operating parameters package;
in response to generating the statement grouping and the parse tree, generate a data model to show metadata that describes the one or more routines from the statement grouping using the parse tree and based on the operating parameters in the second operating parameters package;
in response to generating the data model, generate one or more routine definitions from the data model based on the operating parameters in the third operating parameters package; and
creating the one or more routines from the one or more routine definitions.

8. The computer program product of claim 7, wherein the statement grouping includes content for defining one routine and one or more statements that are used to invoke other routines.

9. The computer program product of claim 8, wherein, when generating the statement grouping, the computer readable program when executed on a computer causes the computer to:
generate one or more schemas, wherein the content for the routine includes one or more statements that access the one or more schemas.

10. The computer program product of claim 7, wherein the one or more routine definitions are compiled to create the one or more routines and wherein the one or more routines are executed to test a data store.

11. The computer program product of claim 10, wherein at least one of the routines invokes one or more other routines.

12. The computer program product of claim 7, wherein the one or more routine definitions are embedded in an external programming language.

13. A system for generating a test suite, comprising:
hardware logic performing operations, the operations comprising:
receiving operating parameters that reflect constraints on the test suite;
selecting one or more statements to be included in one or more routines based on the operating parameters;

separating the operating parameters into a first operating parameters package, a second operating parameters package, and a third operating parameters package;

generating a statement grouping and a parse tree that describes the statement grouping based on the operating parameters in the first operating parameters package;

in response to generating the statement grouping and the parse tree, generating a data model to show metadata that describes the one or more routines from the statement grouping using the parse tree and based on the operating parameters in the second operating parameters package;

in response to generating the data model, generating one or more routine definitions from the data model based on the operating parameters in the third operating parameters package; and creating the one or more routines from the one or more routine definitions.

14. The system of claim 13, wherein the statement grouping includes content for defining one routine and one or more statements that are used to invoke other routines.

15. The system of claim 14, wherein operations for generating the statement grouping further comprise:

generating one or more schemas, wherein the content for the routine includes one or more statements that access the one or more schemas.

16. The system of claim 13, wherein the one or more routine definitions are compiled to create the one or more routines and wherein the one or more routines are executed to test a data store.

17. The system of claim 16, wherein at least one of the routines invokes one or more other routines.

18. The system of claim 13, wherein the one or more routine definitions are embedded in an external programming language.

* * * * *